Figure 1:
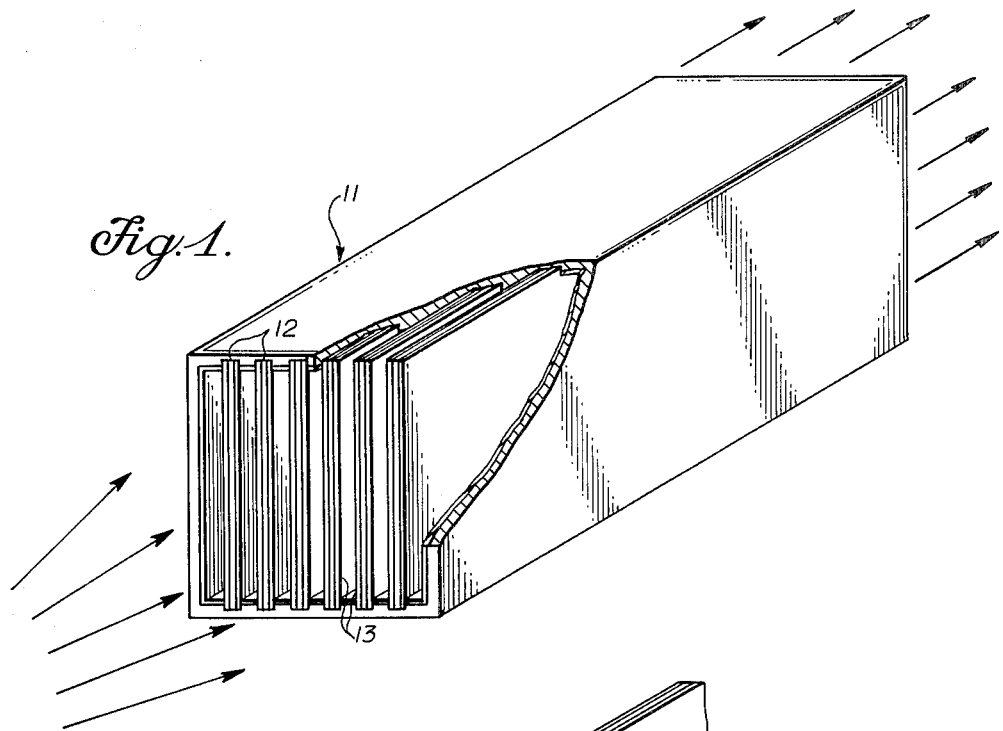

June 21, 1966    I. R. JONES    3,257,560
NEUTRON COLLIMATOR WITH SURFACE COATINGS TO
SUPPRESS NEUTRON REFLECTION
Filed May 24, 1963

INVENTOR.
IAN R. JONES

BY

ATTORNEY

United States Patent Office 3,257,560
Patented June 21, 1966

3,257,560
NEUTRON COLLIMATOR WITH SURFACE COATINGS TO SUPPRESS NEUTRON REFLECTION
Ian R. Jones, Livermore, Calif., assignor to the United States of America as represented by the United States Atomic Energy Commission
Filed May 24, 1963, Ser. No. 283,123
6 Claims. (Cl. 250—105)

The invention described herein was made in the course of, or under, Contract W-7405-ENG-48 with the United States Atomic Energy Commission.

The present invention relates to instruments having neutron passages therein, and more particularly to neutron collimators and monochromators.

Neutron collimators and mechanical monochromators are usually made of metals such as steel and aluminum. The comparatively high neutron reflectivity of these materials, however, inhibits the performance of these devices. For an illustration of this fact, consider the paths of neutrons incident at various angles on a collimator cavity having walls of length L spaced a distance $d$ apart. The cavity axis and preferred direction of the neutron flux emerging from the cavity are parallel to the walls. The maximum angular deviation from this axis, neglecting reflection, is the path of a neutron that traverses the cavity diagonally. The magnitude of this angle is arc tan $d/L$. However, neutrons incident on the wall surfaces at angle $\alpha$ where $\alpha$ is less than the angle of total deflection, will also traverse the cavity by reflecting from the walls, thus describing a zig zag path through the cavity.

Thus the divergence of the neutron beam from a collimator depends on the geometry of the collimator only as long as arc tan $(d/L) \geq \alpha$, where $d$ is the width and $L$ the length of the collimator cavity and $\alpha$ the incidence angle of neutrons on the surfaces at which an intolerably high fraction of the incident neutrons is reflected through the collimator. These neutrons will continue to pass through the collimator, even if the ratio $d/L$ is further decreased.

Analogously, in the case of mechanical monochromators of the helical rotor type, there exists a degree of dimensional refinement of the neutron monochromator channels beyond which no further selectivity of neutrons according to velocity can be achieved because of such neutron reflection from the channel surfaces.

In the past, attempts to improve the above devices have been chiefly mechanical in nature, such as the provision of baffle-like obstructions disposed in various arrangements at the collimator walls to block the paths of reflected neutrons. However, associated with these mechanical obstructions are distinct disadvantages, inasmuch as they are not readily installable in equipment already in existence, nor are they efficient and economical.

Accordingly, the primary object of the present invention is to provide a method of reducing neutron reflectivity of material surfaces defining neutron passages to a minimum.

Another object of the invention is to provide a neutron reflection inhibitor in the form of a coating.

A further object of the invention is to provide a coating which inhibits reflection of neutrons from surfaces defining neutron passages through collimators and the like, which is easy to apply, even to experimental equipment already in use.

Other objects and advantages will become apparent to those skilled in the art upon consideration of the following description taken in conjunction with the attached drawing, in which:

FIGURE 1 is an oblique presentation of a neutron collimator with a cutaway section.

Figure 2:
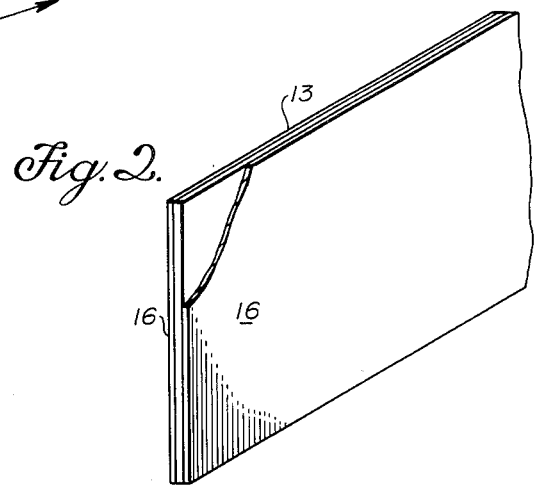

FIGURE 2 is an oblique presentation of a coated collimator blade. In general it has been found that total reflection of neutrons from collimator walls or any body having material surfaces which define a passageway through which neutrons are directed can be completely eliminated and the partially reflected neutron flux of 5 A. neutrons incident at an angle of 5 minutes decreased to less than about 2% if the surfaces exposed to the incident neutron flux are coated with an organic compound characterized by the property that the sum of the products obtained by multiplying the number of atoms per unit volume of each atomic species of the compound by the bound coherent scattering amplitude of this atomic species, the summation being carried out over all atomic species of the molecule, is a number between zero and about $-5 \times 10^8$ barns/cc. In mathematical form this condition may be written $$0 > \sum_j N_j a_j > -5 \times 10^8 \text{ barns/cc.}$$

where "N" refers to the number of scattering centers per unit volume "$a$" to the bound coherent scattering amplitude, and "$j$" to the $j$th atomic species in the molecule. The term $$\sum_j N_j a_j$$

will hereafter be referred to as the "Na product" of a compound.

It is to be understood, however, that the above measure is of benefit not only in the specified case of 5 A. neutrons incident at an angle of 5 minutes, but that it generally greatly reduces partial reflection of slow neutrons incident at any angle.

Very few organic compounds have such a low Na product. One such substance, however, is tetradecanoic acid, also known as myristic acid. This compound is stable even at temperatures moderately above its melting point, and it does not absorb or adsorb any gases. Tetradecanoic acid, is a relatively low melting substance. Its melting point is 58° C. Since the preferred methods of coating surfaces require the coating materials to be in the liquid state, it is important in these methods to deal with low melting substances as it obviates precautions against thermal stress damage as well as generally facilitating the coating processes themselves. A 1 mil thickness of the coating has been found to adequately attenuate the neutron flux.

Other compounds having an Na product within the indicated range are glycol distearate and palmitic acid. However, due to its especially favorable Na product, tetradecanoic acid is the preferred coating material.

Referring now to a representative collimator shown in FIGURE 1, a metal casing 11 of rectangular cross section, provided with longitudinal grooves 12 at the inside top and bottom surfaces, holds a multitude of removable metal blades 13 in said grooves. The slitlike cavities between blades 13 define the neutron passages. These collimator blades and the inside surfaces of the metal casing 11 are coated with tetradecanoic acid.

To provide an object, such as collimator blade, with a tetradecanoic acid coating, its surfaces are first thoroughly cleaned and dried. Then the object is simply dipped into a bath of the molten compound. When the object is withdrawn, a thin, tough cover of tetradecanoic acid remains on the metal surfaces. The thickness of the coating depends on the rate of withdrawal of the object from the bath and the temperature of the bath. Both parameters are easily adjustable to yield the desired coating thickness with any organic compound which is suitable for use as a coating. In the case of tetradecanoic acid, its viscosity immediately above the melting point, i.e., above 58° C., is low enough to produce thin coatings of appropriate thickness at withdrawal rates of up to about 5 in./sec. In the case of more viscous materials, temperature elevation will decrease the viscosity, while in the case of less viscous materials, the rate of withdrawal from the bath may be decreased.

Alternatively, the collimator parts may be coated by spray painting or even brushing, although in the latter case the resulting cover is not as smooth and uniform.

FIGURE 2 shows a collimator blade 13 provided with a tetradecanoic acid coating 16.

*Example*

A stainless steel collimator, similar to that shown in FIG. 2 was coated with tetradecanoic acid by dipping the components into a bath of molten tetradecanoic acid at 65 degrees centigrade. The components were withdrawn from this bath at a rate of about 1 in./sec.

The resultant coating was 1 mil thick. Prior to coating with tetradecanoic acid the collimator performed as listed below. All data refer to neutrons of a wavelength of 5 angstrom units.

Critical angle of total reflection_____ 16 min.
Incidence angle at which the reflectivity coefficient has decreased to .05_____ 20.5 min.
After treatment of the surfaces with tetradecanoic acid the corresponding values were found to be:
Critical angle of total reflection_____ 0 min.
Incidence angle at which the reflectivity coefficient has decreased to .05_____ 5 min.
Reflectivity coefficient for an incidence angle of 3 min._____ .006
Reflectivity coefficient for an incidence angle of 5 min._____ .001

As can be seen from the above example, the present invention is extremely effective in suppressing neutron reflection and enables easy modification of existing equipment. Although the example deals only with tetradecanoic acid, other organic compounds which have the specified Na product value and are solids at room temperature are applicable as coatings in a similar manner.

Hence, the scope of the invention should only be limited by the following claims.

What is claimed is:

1. An instrument for defining neutron paths comprising a body having material surfaces which define a passageway through which neutrons are directed, and a coating of an organic compound disposed on said surface, said organic compound having an Na product defined by the inequality $$0 \geq \sum_j N_j a_j \geq -5 \times 10^3 \text{ barns/cc.}$$

where $\sum_j$ is the symbol for summation, $j$ is a particular atomic species of said organic compound,
$N_j$ is number of atoms in the $j^{\text{th}}$ atomic species of said organic compound,
$a_j$ is the bound coherent scattering amplitude of the $j^{\text{th}}$ atomic species of said organic compound, and
$N_a$ is the summation of the $N_j a_j$ products.

2. An instrument for defining neutron paths comprising a body having material surfaces which define a passageway through which neutrons are directed and a coating of tetradecanoic acid disposed on the material surfaces of said passageway.

3. The instrument of claim 2 wherein the thickness of the tetradecanoic acid coating is approximately one mil.

4. A neutron collimator having an entrance and an exit comprising walls defining a passageway for neutrons to pass from the entrance to the exit of said collimator, and a coating of an organic compound selected from the group consisting of tetradecanoic acid, glycol distearate, and palmitic acid disposed on said wall surfaces encompassing said neutron path in juxtaposition.

5. The neutron collimator of claim 4 wherein the organic compound is tetradecanoic acid, said coating being about 1 mil thick.

6. A neutron collimator comprising a metallic sleeve of rectangular cross section having longitudinal slots parallel to the axis of the sleeve equally spaced on opposing inside surfaces, metal blades adapted to be removably held in parallel spacing by said slots, and a coating of tetradecanoic acid disposed on the surfaces of said metal blades and interior surfaces of said sleeve with the thickness of said coating being at least 1 mil.

References Cited by the Examiner
UNITED STATES PATENTS 2,449,066  9/1948  Friedman _____ 250—51.5
3,013,157  12/1961  Norton _____ 250—51.5

FOREIGN PATENTS 1,090,877  10/1960  Germany.

RALPH G. NILSON, *Primary Examiner.*

W. F. LINDQUIST, *Assistant Examiner.*